United States Patent
Van Sickle

[15] 3,695,680
[45] Oct. 3, 1972

[54] BINOCULAR GLARE SHIELD

[72] Inventor: John Van Sickle, 1841 Billington Road, East Aurora, N.Y. 14052

[22] Filed: June 4, 1970

[21] Appl. No.: 43,449

[52] U.S. Cl. ...............................................296/97 F
[51] Int. Cl. ...............................................B60j 3/00
[58] Field of Search ..........296/97 R, 97 C, 97 F, 146

[56] References Cited

UNITED STATES PATENTS 3,038,756   6/1962   Heimer......................296/146
3,515,427   6/1970   Van Sickle...............296/97 R

*Primary Examiner*—Benjamin Hersh
*Assistant Examiner*—John A. Pekar

[57] ABSTRACT

A glare reducing device for viewing having for its main body portion a sheet of transparent glare reducing material so constructed that no image of either of its side edges will be visible to either eye of the observer.

8 Claims, 3 Drawing Figures

PATENTED OCT 3 1972

INVENTOR.
John Van Sickle

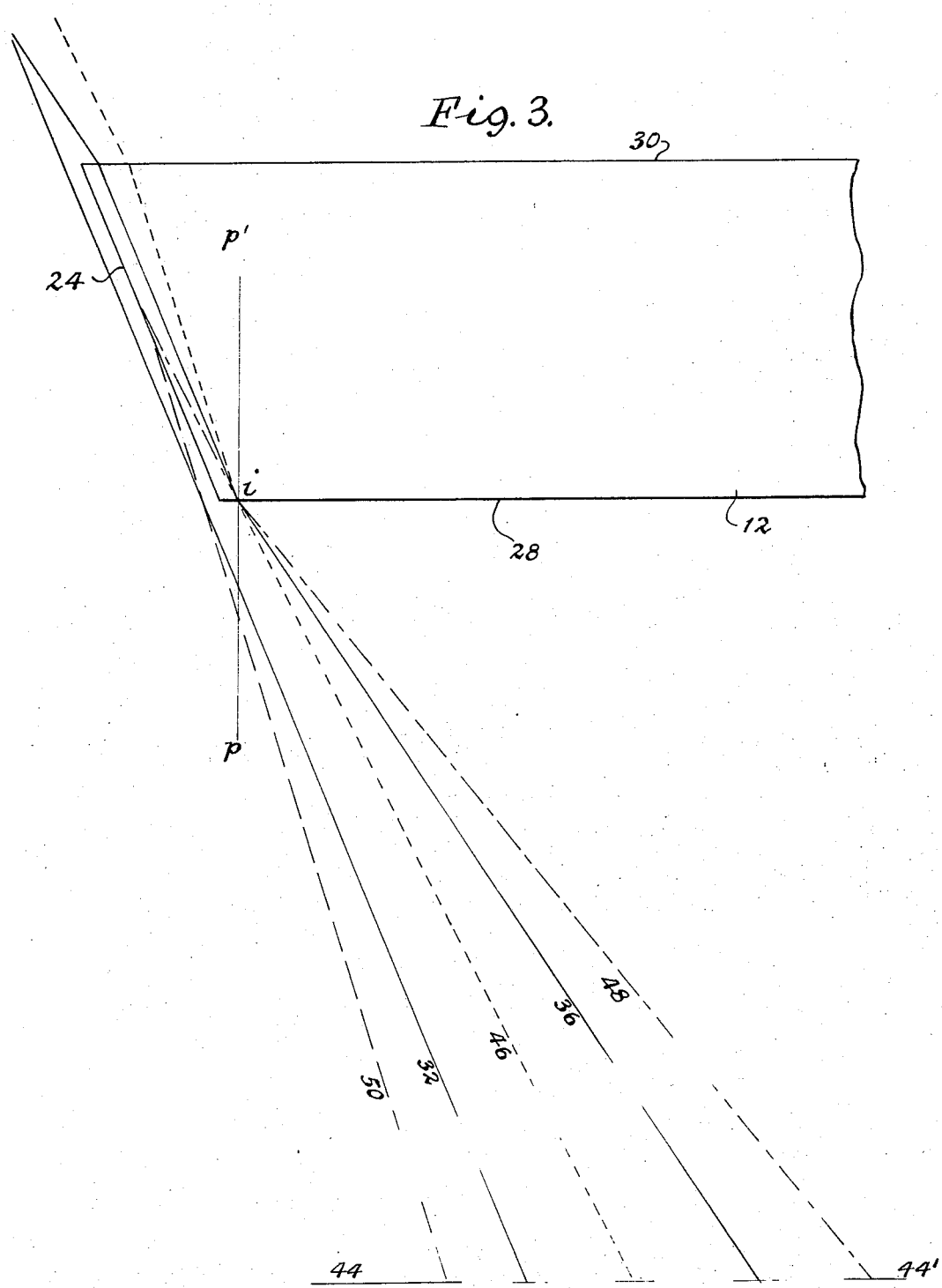

BINOCULAR GLARE SHIELD

BACKGROUND OF THE INVENTION

The present invention relates to a glare reducing device for viewing objects ahead, such as a glare shield for use in reducing the glare encountered in driving a motor vehicle, having for its main body portion a sheet of transparent glare reducing material held transversely in the line of sight of the observer. A difficulty encountered with such a shield is that images of the edges of the body of the shield may be visible to the observer. These images, appearing as darkened or illuminated lines depending upon light conditions, are distracting to the observer.

Under the prior art, images of the lower and upper edges of the body of the shield can be eliminated by beveling such edges to be in line with the eyes of the observer (see applicant's U.S. Pat. No. 3,515,427). Also, under the prior art as disclosed in said patent, a given side edge may be beveled so as to be in line with a given eye of the observer, and hence to eliminate any image of said edge as seen by such eye of the observer; but, since the edge is viewed by the other eye of the observer from a different angle, due to the distance between the eyes, or pupillary distance, of the observer, an image of the said side edge may still be seen by the other eye of the observer. Such an image has the effect of distracting the observer and hindering the use of the shield.

It is an object of the present invention to provide a means of constructing the shield so that images of the side edges of its body portion will be eliminated when the shield is seen at the same time by each eye of the observer, thus effecting total invisibility of the side edges.

SUMMARY OF THE INVENTION

In short, the present invention relates to a glare shield having a sheet of transparent glare reducing material as its main body portion and means for holding said sheet transversely in the line of sight of the observer, such sheet having, in relation to the distance of the sheet from the eyes of the observer, the pupillary distance of the observer and the refractive index of the material of which the sheet is composed, the combination of a transverse extent sufficient to permit, and angulation of its side edges designed correspondingly to effect, the result that an incoming ray of light from a source ahead passing immediately outside one of said edges and parallel thereto will pass outside the laterally corresponding eye of the observer and an incoming ray of light from a source ahead striking said sheet immediately within said edge at an angle of incidence so as to be refracted to pass through said sheet immediately within said edge and parallel thereto will be refracted on emergence from the sheet to pass outside the laterally noncorresponding eye of the observer, with a corresponding similar result as to incoming rays similarly passing, respectively, immediately outside and immediately inside the other side edge of the sheet.

BRIEF DESCRIPTION OF THE DRAWINGS

FIG. 3 is an enlarged diagramatic view of a part of the section of FIG. 2 and further shows how the invention works.

DESCRIPTION OF THE PREFERRED EMBODIMENT

Figure 1:
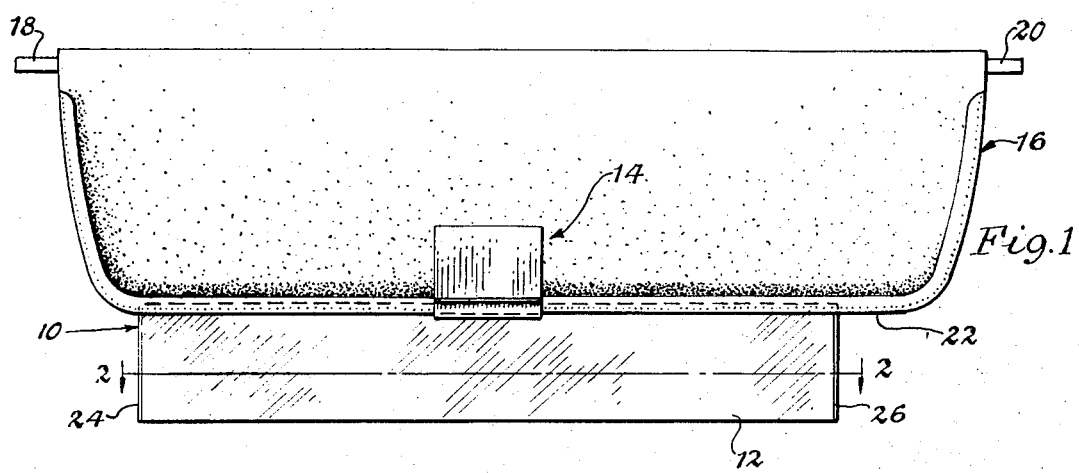
FIG. 1 is an elevational view showing a glare shield of the present invention attached to an automobile sun visor so as to be transversely in the line of sight of the operator.

Referring more particularly to FIG. 1, the reference numeral 10 therein indicates in general a glare shield according to the present invention. The glare shield 10 has a body portion 12 consisting of a sheet of transparent glare reducing material, preferably plastic, and means for holding the body portion 12 transversely in the line of sight of the observer, such means being in the illustration a clip device 14 for attachment to a motor vehicle sun visor 16 disposed in a vertical position, such as the device disclosed in applicant's pending application Ser. No. 875,929. The sun visor 16 is provided with mounting members 18 and 20 by which it is pivotally attached to the interior of the vehicle and, as disposed, has a transversely extending substantially horizontal lower or bottom edge 22. The body portion 12 of the glare shield projects below the edge 22 as an extension of the sun visor, and has left and right side edges 24 and 26, preferably flat and vertical, as shown. Although within limits the glare shield 10 may be tilted forward or back with the sun visor to meet the convenience of the observer, for best results the body portion 12 should be positioned generally perpendicular to the line of sight of the observer.

Figure 2:
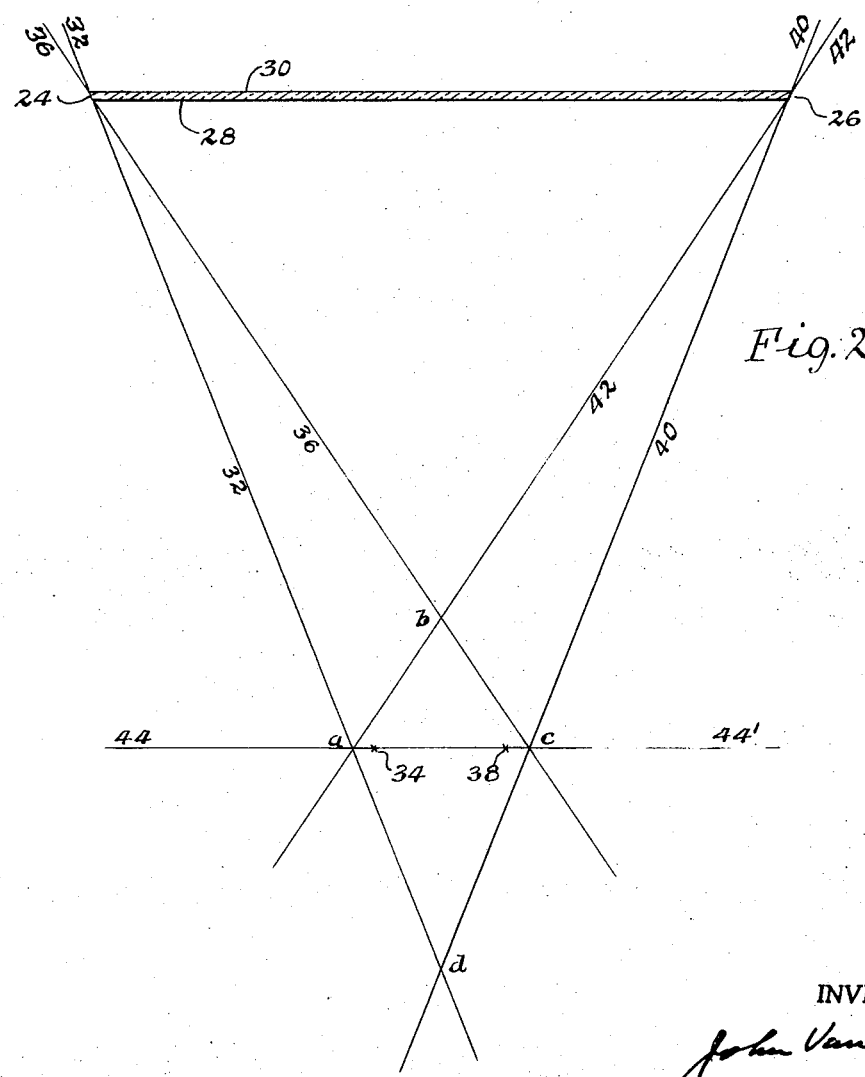
FIG. 2 is a horizontal section taken along the plane of section line 2—2 in FIG. 1 and shows the position of the eyes of the observer in relation to the position of the shield, the angle of the side edges and the areas within which no images of the side edges are visible.

In FIG. 2 the side edge 24 is seen to make an interior obtuse angle with the near surface 28 of the body 12 and an interior acute angle with the forward surface 30 of the body 12, the surfaces 28 and 30 preferably being parallel. Likewise, the side edge 26 is seen to make an interior obtuse angle with the near surface 28 and an interior acute angle with the forward surface 30.

The line 32 describes the path of a ray of light, incoming towards the observer, which passes immediately outside the surface of the edge 24 and parallel thereto, and also passes outside the left eye 34 of the observer.

The line 36 is the path of a ray of light striking the forward surface 30 at a point immediately within the edge 24 at an angle of incidence so as to be refracted to pass through the body 12 immediately within the edge 24 and parallel thereto and on emergence from the body 12 to be refracted so as to pass outside the right eye 38 of the observer.

The line 40 describes the path of a ray of light, incoming towards the observer, which passes immediately outside the surface of the edge 26 and parallel thereto, and also passes outside the right eye 38 of the observer.

The line 42 is the path of a ray of light striking the forward surface 30 at a point immediately within the edge 26 at an angle of incidence so as to be refracted to pass through the body 12 immediately within the edge 26 and parallel thereto and on emergence from the body 12 to be refracted so as to pass outside the left eye 34 of the observer.

As used herein, a ray of light passes outside an eye of the observer when it strikes a point outside such eye on an extended line 44—44' drawn through the pupils of the eyes 34 and 38 of the observer.

For convenience of illustration, the lines 32, 36, 40 and 42 are drawn to approach the observer in the same plane.

It will be observed that rays of light traveling towards the observer along the lines 32 and 36 will not strike, and hence will show no image of, the edge 24, and that rays of light traveling towards the observer along the lines 40 and 42 will not strike, and hence will show no image of, the edge 26.

Referring now to FIG. 3, the dotted line 46 represents the path of a ray of light from a point on the line 44—44' within its intersections with the lines 32 and 36, traveling in the plane of said lines and striking the near surface 28 at a point of incidence $i$, immediately within the edge 24. Point $i$, in addition, marks the place where the ray 36 emerges from the surface 28, and the line 36 also indicates the path of a ray of light traveling in the opposite direction.

As will be seen, the ray 46 will be refracted to pass within the body 12. This is because the line 46 strikes the surface 28 at an angle of incidence, measured with respect to the perpendicular $ip$ at $i$, less than that of the line 36. Therefore, under the laws of physics, the angle of refraction of the ray 46, as measured in the body 12 with respect to the perpendicular $ip'$ at $i$, will be less than that of a ray traveling towards the surface 28 along the line 36. Hence, the line 46 will pass within the body 12, and will not strike the edge 24. Since light will travel the same course in either direction, it follows that a ray of light traveling towards the observer along the line 46 will show no image of the edge 24.

Were the line 46 drawn to pass to the left of the intersection of the surface 28 with the edge 24, it obviously would not strike the edge 24, nor would an image of such edge be visible from a ray of light traveling towards the observer along such a line.

The bar-dot line 48 in FIG. 3 represents the path of a ray of light from a point on the line 44—44' outside its intersection with the line 36 traveling within the plane of the lines 32 and 36 and striking the near surface 28 at a point close to or immediately within the edge 24, such as at $i$, at an angle of incidence, as measured with respect to the perpendicular $ip$ at $i$, greater than that of the line 36. The angle of refraction of the ray 48, as measured in the body 12 with respect to the perpendicular $ip'$ at $i$, will be greater than that of a ray traveling towards the surface 28 along the line 36, and hence the ray 48 will strike the edge 24 as shown. It follows that a ray of light traveling towards the observer along the line 48 will show an image of the edge 24.

It will be noted that the angles of refraction of the various rays in the relatively dense material of the shield are less than the respective angles of incidence in the less dense atmosphere. It is the refractive power of the material of the shield which makes the invention possible.

The broken line 50 in FIG. 3 represents the path of a ray of light from a point on the line 44—44' outside its intersection with the line 32 traveling within the plane of the lines 32 and 36 and passing outside the surface 28 immediately without or close to its intersection with the edge 24. As will be seen, the ray 50 will strike the edge 24. Accordingly, a ray of light traveling towards the observer along the line 50 will show an image of the edge 24.

It has been shown above that from a point of observation on the plane of and within the lines 32 and 36, no image of the edge 24 will be visible, but that an image of the edge 24 will be visible from a point of observation on such plane outside either the line 32 or the line 36. It similarly can be shown that from a point of observation on the plane of and within the lines 40 and 42 no image of the edge 26 will be visible, but that an image of the edge 26 will be visible from a point of observation on such plane outside either the line 40 or the line 42. The area within the lines 32 and 36 and also within the lines 40 and 42 on the plane of such lines, being designated in FIG. 2 by the quadrilateral $abcd$, represents the area on such plane within which no image of either the edge 24 or the edge 26 will be visible. Hence, if both eyes of the observer are within the area $abcd$ no image of either side edge of the body of the shield will be visible to either eye of the observer.

In order for both eyes of the observer to be within the quadrilateral $abcd$, the divergence of the rays 32 and 36 and also of the rays 40 and 42 must be such as to produce a transverse separation of such respective rays at the distance of the eyes of the observer from the shield greater than the pupillary distance of the observer. It is noted that the average pupillary distance of adult human beings is about 65 mm. and that the distance ranges from about 55 mm. to about 75 mm. Other factors besides the pupillary distance of the observer entering into the result are the distance of the eyes of the observer from the body of the shield, the refractive index of the material of which the body of the shield is made, and the transverse extent or length of the body of the shield.

To achieve the desired result of elimination of the images of the side edges of the body of the shield, it has been found that for an observer with a pupillary distance of 65 mm. positioned so that the distance of the observer's eyes from the body of the shield is approximately 29 cm. and using for the body of the shield a sheet of acrylic plastic material having a refractive index of 1.50, the length of the body of the shield as measured on its near surface should be in the order of 31 cm. and the interior angle formed by each side edge of the body of the shield with such near surface should be about 112 ½°. This will produce a transverse extent of the quadrilateral $abcd$ of approximately 75 mm. located at the distance of the eyes of the observer from the body of the shield, and will permit some latitude and range of viewing position within the quadrilateral $abcd$ for the average person, it being apparent that the less the pupillary distance of the observer, the greater the latitude and range of viewing position. Greater latitude and range of viewing position, as resulting from increasing the transverse extent of the quadrilateral $abcd$, could be obtained by increasing the length of the body of the shield, by reducing the distance of the eyes of the observer from the body of the shield, or, if obtainable, by using a material with a greater refractive index, and adjusting the angle of each side edge accordingly. A variation in any one of these factors would permit a compensating variation in any one or both of the others.

The present invention advances the art by showing how a glare shield can be constructed so as to eliminate completely images of the side edges of the shield as seen by each eye of the observer. This makes possible the construction of a shield no images of the edges of which will be visible.

I claim:

1. A glare reducing device for viewing comprising a body of transparent glare reducing sheet material and means for positioning said body transversely in the line of sight of an observer and in a selected forwardly spaced and laterally positioned relation to the observer, such body having a selected index of refraction and a vertically extending beveled side edge face forming a selected interior obtuse angle with that surface of said body facing the observer such that (1) an incoming ray of light passing immediately outside said side edge face and parallel thereto will pass outside the laterally corresponding eye of the observer, and (2) an incoming ray of light striking the forward surface of said body immediately within its intersection with said side edge face so as to be refracted to pass through said body parallel to said side edge face will be refracted on emerging from said body to pass outside the laterally noncorresponding eye of the observer, whereby said side edge face will not be visible to either eye of the observer.

2. A glare reducing device constructed according to claim 1 wherein said vertically extending beveled side edge face is a left side edge face.

3. A glare reducing device constructed according to claim 1 wherein said vertically extending beveled side edge face is a right side edge face.

4. A glare reducing device for viewing comprising a body of transparent glare reducing sheet material and means for positioning said body transversely in the line of sight of an observer and in a selected forwardly spaced and laterally positioned relation to the observer, such body having a selected index of refraction, a selected transverse extent and opposite vertically extending beveled side edge faces each forming a selected interior obtuse angle with that surface of said body facing the observer such that (1) an incoming ray of light passing immediately outside one of said side edge faces and parallel thereto will pass outside the laterally corresponding eye of the observer, (2) an incoming ray of light striking the forward surface of said body immediately within its intersection with said one side edge face so as to be refracted to pass through said body parallel to said one side edge face will be refracted on emerging from said body to pass outside the laterally noncorresponding eye of the observer, (3) an incoming ray of light passing immediately outside the other of said side edge faces and parallel thereto will pass outside the laterally corresponding eye of the observer, and (4) an incoming ray of light striking the forward surface of said body immediately within its intersection with said other side edge face so as to be refracted to pass through said body parallel to said other side edge face will be refracted on emerging from said body to pass outside the laterally noncorresponding eye of the observer, whereby neither of said side edge faces will be visible to either eye of the observer.

5. In an automobile glare shield having a body of glare reducing sheet material fastened to an automobile sun visor, disposed substantially vertically and provided with a transversely extending substantially horizontal lower edge, so that such body extends below the bottom edge of the sun visor as an extension thereof, the improvement of a main body portion below the bottom edge of the sun visor and means for positioning said main body portion transversely in the line of sight of an observer and in a selected forwardly spaced and laterally positioned relation to the observer, such main body portion having a selected index of refraction and a vertically extending beveled side edge face forming a selected interior obtuse angle with that surface of said main body portion facing the observer such that (1) an incoming ray of light passing immediately outside said side edge face and parallel thereto will pass outside the laterally corresponding eye of the observer, and (2) an incoming ray of light striking the forward surface of said main body portion immediately within its intersection with said side edge face so as to be refracted to pass through said main body portion parallel to said side edge face will be refracted on emerging from said main body portion to pass outside the laterally noncorresponding eye of the observer, whereby said side edge face will not be visible to either eye of the observer.

6. A glare shield constructed according to claim 5 wherein said vertically extending beveled side edge face is a left side edge face.

7. A glare shield constructed according to claim 5 wherein said vertically extending beveled side edge face is a right side edge face.

8. In an automobile glare shield having a body of glare reducing sheet material fastened to an automobile sun visor, disposed substantially vertically and provided with a transversely extending substantially horizontal lower edge, so that such body extends below the bottom edge of the sun visor as an extension thereof, the improvement of a main body portion below the bottom edge of the sun visor and means for positioning said main body portion transversely in the line of sight of an observer and in a selected forwardly spaced and laterally positioned relation to the observer, such main body portion having a selected index of refraction, a selected transverse extent and opposite vertically extending beveled side edge faces each forming a selected interior obtuse angle with that surface of said main body portion facing the observer such that (1) an incoming ray of light passing immediately outside one of said side edge faces and parallel thereto will pass outside the laterally corresponding eye of the observer, (2) an incoming ray of light striking the forward surface of said main body portion immediately within its intersection with said one side edge face so as to be refracted to pass through said main body portion parallel to said one side edge face will be refracted on emerging from said main body portion to pass outside the laterally noncorresponding eye of the observer, (3) an incoming ray of light passing immediately outside the other of said side edge faces and parallel thereto will pass outside the laterally corresponding eye of the observer, and (4) an incoming ray of light striking the forward surface of said main body portion immediately within its intersection with said other side edge face so as to be refracted to pass through said main body portion parallel to said other side edge face will be refracted on emerging from said main body portion to pass outside the laterally noncorresponding eye of the observer, whereby neither of said side edge faces will be visible to either eye of the observer.

* * * * *